(No Model.)
W. E. RICHARDS.
AIR INDICATOR FOR BICYCLE TIRES.
No. 602,242.   Patented Apr. 12, 1898.
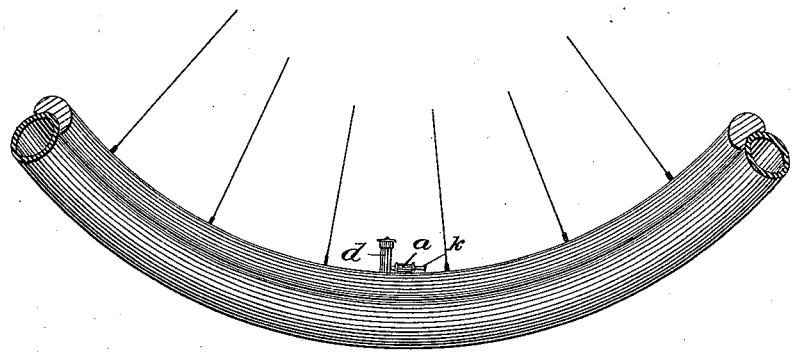
Fig. 1.
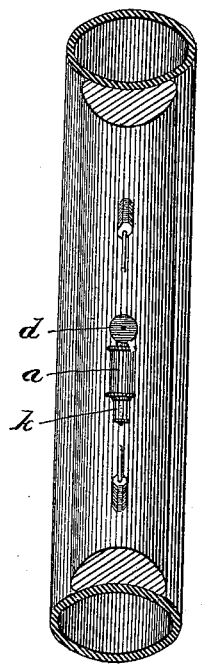
Fig. 2.
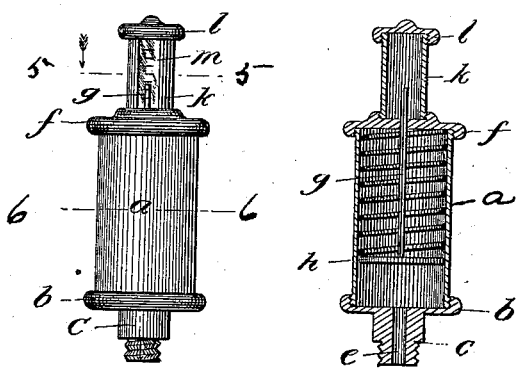
Fig. 3.   Fig. 4.
Fig. 5.   Fig. 6.
Fig. 7.
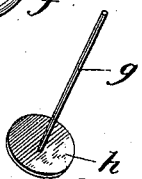
Witnesses
J. P. Appleman
A. M. Wilson
Inventor
W. E. Richards
by Henry C. Evert
Attorney

UNITED STATES PATENT OFFICE.

WINDSOR E. RICHARDS, OF WILKINSBURG, PENNSYLVANIA.

AIR-INDICATOR FOR BICYCLE-TIRES.

SPECIFICATION forming part of Letters Patent No. 602,242, dated April 12, 1898.

Application filed August 23, 1897. Serial No. 649,154. (No model.)

*To all whom it may concern:*

Be it known that I, WINDSOR E. RICHARDS, a citizen of the United States of America, residing at Wilkinsburg, in the county of Allegheny and State of Pennsylvania, have invented certain new and useful Improvements in Air-Indicators for Bicycle-Tires, of which the following is a specification, reference being had therein to the accompanying drawings.

This invention relates to certain new and useful improvements in air-indicators for bicycle-tires and the like, and has for its object to provide an indicator which may be attached to the valve of the ordinary bicycle-tire in a manner to indicate the pressure of the air in the same.

The invention consists, briefly, in an air-cylinder having a plug connection with the valve or air-inlet pipe of the tire and having arranged therein a plunger or piston which is adapted to be actuated by the air and register the amount of pressure upon a gage provided at the outer or free end of the cylinder.

The invention further aims to construct a device of this nature that will be extremely simple in its construction, strong, durable, effectual in its operation, and comparatively inexpensive to manufacture.

With the above and other objects in view the invention finally consists in the novel construction, combination, and arrangement of parts to be hereinafter more specifically described, and particularly pointed out in the claim.

In describing the invention in detail reference is had to the accompanying drawings, forming a part of this specification and wherein like letters of reference indicate similar parts throughout the several views, in which—

Figure 1 is a perspective view of a portion of the tire-rim and tire, showing my device in position. Fig. 2 is a top plan view of the same. Fig. 3 is a side elevation of the indicator. Fig. 4 is a longitudinal sectional view of the same. Fig. 5 is a cross-sectional view taken on the line 5 5 of Fig. 3. Fig. 6 is a similar view taken on the line 6 6 of Fig. 3. Fig. 7 is a perspective view of the piston or plunger forming the indicator.

Referring now to the drawings by reference-letters, $a$ indicates the air-cylinder, which is firmly secured within a cap $b$, having a screw-plug $c$, which is adapted to engage in the valve or air-inlet pipe $d$ of the tire, said plug $c$ having an aperture $e$, which communicates with the aperture in the valve or pipe and with a chamber in the air-cylinder. The cylinder is closed at its top by a similar cap $f$, provided with a central aperture to receive the indicating-rod $g$, which carries a piston-head $h$, adapted to operate within the cylinder, a coil-spring arranged between said piston-head $h$ and the cap $f$ serving to counteract the pressure of the air against said piston-head. The indicating-rod $g$ projects through the cap $f$ into the chamber of the tube or cylinder $k$, which is secured to the said cap $f$ and is provided on its upper end with a cap $l$ and on its one side with a glass indicator $m$, the end of the rod registering the amount of pressure on said indicator.

By this arrangement and construction it will be observed that the pressure of air in the tires may be readily determined by reason of the free access of the air through the plug $c$ and the air-chamber $a$, where it acts upon the piston and registers the pressure at the indicator.

It will also be noted that various changes may be made in the details of construction without departing from the general spirit of my invention.

Having fully described my invention, what I claim as new, and desire to secure by Letters Patent, is—

In an air-pressure indicator for bicycles and the like consisting of an air-inlet, a plug secured in the air-inlet, the opening in the plug communicating with the air-inlet, an air-cylinder secured in said plug, said air-cylinder extending longitudinally of the bicycle-rim, and at a right angle to the air-inlet plug, a cap secured to said air-cylinder and provided with a central aperture, a smaller cylinder having a graduated glass scale secured in one side, a piston-head operating in the air-cylinder, a rod secured to said piston-head and passing through the aperture in the cap, a coil-spring arranged between the piston-head and cap, said spring being compressed when the pressure of the atmosphere is increased, said atmospheric pressure being measured by the piston-rod and graduated scale, substantially as shown and described.

In testimony whereof I affix my signature in presence of two witnesses.

WINDSOR E. RICHARDS.

Witnesses:
JOHN NOLAND,
H. E. SEIBERT.